Patented Apr. 8, 1941

2,237,410

UNITED STATES PATENT OFFICE 2,237,410

PREGNANOLONES AND METHOD FOR PRODUCING THE SAME FROM PREGNANDIONES

Adolf Butenandt, Berlin-Dahlem, Germany, assignor, by mesne assignments, to Schering Corporation, Bloomfield, N. J., a corporation of New Jersey No Drawing. Original application December 24, 1934, Serial No. 759,115. Divided and this application April 10, 1939, Serial No. 267,181. In Germany December 23, 1933

7 Claims. (Cl. 260—397)

(Granted under the provisions of sec. 14, act of March 2, 1927; 357 O. G. 5)

This invention relates to organic compounds of the cyclopentanopolyhydrophenanthrene series and more particularly to pregnanolones and their derivatives, such as their esters, and to a method of producing such compounds.

The present application is a division of my application Serial No. 759,115, filed December 24, 1934.

In accordance with the present invention, a pregnandiol, produced or obtained in any known or suitable manner, is first oxidized to pregnandion and the latter is then converted into pregnanolon by partial reduction which is carried out in such a manner that only one keto group is reduced to an alcohol group.

The first phase of this method, the oxidation of the pregnandiol to pregnandion, has already been carried out and described by me (Berichte der deutschen chem. Gesellschaft, vol. 63, p. 662/63) where also the complete reduction of pregnandion to pregnan by means of concentrated hydrochloric acid and zinc amalgam while heating, is described (l. c. vol. 64, page 2536). The partial reduction of pregnandion to pregnanolon, however, was successful for the first time by the process claimed herein. The partial reduction can not only be carried out by means of catalytically or otherwise activated hydrogen but also by treatment of the pregnandion in the presence of catalysing agents with compounds that are capable of yielding hydrogen while at the same time forming their corresponding oxidation products, such as tetralin, cyclohexanol etc.

The pregnanolones represent valuable intermediate products for the production of compounds of therapeutic value, such as the hormone of the male germinal gland.

The invention will be described in detail with the aid of the following example which is presented by way of illustration only and not as indicating the limits of the invention.

Example 1 g. of pregnandiol is oxidized according to the method heretofore described by me in the publication above referred to, in 40 ccm. of 90% glacial acetic acid solution with an equal weight of chromic acid anhydride in 40 ccm. of glacial acetic acid in the cold whereby the pregnandion of the melting point 123° C. is obtained.

0.5 g. of said pregnandion is treated, according to Willstaetter's method, in 100 ccm. of glacial acetic acid in the cold with platinum and hydrogen until a quantity of hydrogen is absorbed necessary for the reduction of one carbonyl group. The reduction product, chiefly pregnanolon $C_{21}H_{34}O_2$, has, after recrystallization from alcohol, a melting point of 142° C.

The partial reduction may be carried out also by means of hydrogen in the presence of other catalysts or even with hydrogen in statu nascendi or with atomic hydrogen.

As starting material there may be used not only the pregnandiol as it is isolated as by-product in the production of follicle hormone from urine but also other pregnandiols obtained synthetically.

Thus, for instance, allo-pregnandiol may be converted into allo-pregnanolon by the same procedure as described in the example.

The pregnanolon obtained as above described has the general formula $C_{21}H_{34}O_2$ and can be converted to the ester, ether, chloride, etc. like other alcohols by methods known in the art. The process ordinarily yields both pregnanol-3-one-20 and pregnanol-20-one-3 which can be separated as such by known methods, or by taking advantage of the different properties of their derivatives, such as the esters, condensation products with keto reagents, etc.

Various modifications in the process and reagents may be resorted to within the scope of the appended claims without departing from the principles set forth herein.

What I claim is:

1. The method of producing pregnanolones which comprises partially reducing a pregnandione to convert one of the keto groups to an alcoholic group, and isolating the hydroxy ketone so obtained.

2. The method of producing pregnanolones which comprises partially reducing a pregnandione with the aid of hydrogen and a hydrogenation catalyst in the cold to convert one of the keto groups to an alcoholic group, and isolating the hydroxy ketone so obtained.

3. A method for the production of a pregnanolon of the formula $C_{21}H_{34}O_2$ comprising oxidizing a pregnandiol to the corresponding pregnandione and partially reducing said pregnandione to the corresponding pregnanolon.

4. A method for the production of a pregnanolon of the formula $C_{21}H_{34}O_2$ comprising subjecting pregnandione to partial hydrogenation with catalytically activated hydrogen.

5. A method for the production of a pregnanolon of the formula $C_{21}H_{34}O_2$ comprising subjecting pregnandione to partial hydrogenation with hydrogen in the presence of a hydrogenation catalyst.

6. A method for the production of a pregnanolon of the formula $C_{21}H_{34}O_2$ comprising subjecting pregnandione to partial hydrogenation with a compound capable of yielding hydrogen while at the same time forming their corresponding oxidation products.

7. A method for the production of a pregnanolon of the formula $C_{21}H_{34}O_2$ comprising treating a solution of pregnandione in acetic acid in the cold with hydrogen in the presence of platinum until the quantity of hydrogen is absorbed which is necessary for the reduction of one carbonyl group.

ADOLF BUTENANDT.